US006846421B2

(12) United States Patent
Bratten

(10) Patent No.: US 6,846,421 B2
(45) Date of Patent: Jan. 25, 2005

(54) FILTERING METHOD AND FILTER CHAMBER SEALING ARRANGEMENT

(76) Inventor: Jack R. Bratten, 4657 Twin Fawn La., Orchard Lake, MI (US) 48324

( * ) Notice: Subject to any disclaimer, the term of this patent is extended or adjusted under 35 U.S.C. 154(b) by 173 days.

(21) Appl. No.: 10/320,733

(22) Filed: Dec. 16, 2002

(65) Prior Publication Data

US 2003/0121843 A1 Jul. 3, 2003

Related U.S. Application Data

(63) Continuation-in-part of application No. 09/906,565, filed on Jul. 16, 2001, now Pat. No. 6,495,031.

(51) Int. Cl.[7] .......................... B01D 37/04; B01D 33/04; B01D 35/01; B01D 35/30
(52) U.S. Cl. ....................... 210/741; 210/743; 210/783; 210/387; 210/398; 210/400; 210/406
(58) Field of Search ................................. 210/741, 743, 210/767, 783, 805, 97, 104, 105, 120, 188, 387, 391, 392, 398, 400, 406, 416.5, 472

(56) References Cited

U.S. PATENT DOCUMENTS 4,664,813 A * 5/1987 Schneider .................... 210/771
6,495,031 B1 * 12/2002 Bratten ......................... 210/97
2003/0121843 A1 * 7/2003 Bratten ........................ 210/398

* cited by examiner

Primary Examiner—Robert James Popovics
(74) Attorney, Agent, or Firm—John R. Benefiel

(57) ABSTRACT

A liquid filter method includes use of a filter media belt enclosed by sealably mated cover pan and floor pan defining a vacuum chamber connected to a sealed clean liquid tank, with clean liquid pumped out continuously to draw liquid to be filtered into an upper region of the filter chamber via an inlet hose connected to a source of liquid to be filtered. The cover pan is lifted after the vacuum is relieved to allow indexing of the filter media belt. A main control valve to the clean liquid tank is closed and pumping liquid continues during indexing. A vacuum control device limits the maximum vacuum developed in the clean liquid tank and a vacuum pump removes air from the tank for priming and to eliminate excess accumulated air. A hose seal for the cover is mounted to the filter belt to be moved in and out by the belt movement, allowing cleaning of the seal. A double loop hose seal creates an intervening space into which liquid is directed to minimize air leaks.

10 Claims, 9 Drawing Sheets

FILTERING METHOD AND FILTER CHAMBER SEALING ARRANGEMENT

CROSS REFERENCE TO RELATED APPLICATION

This application is a continuation-in-part of U.S. Ser. No. 09/906,565, filed Jul. 16, 2001 U.S. Pat No. 6,495,031.

BACKGROUND OF THE INVENTION

This invention concerns filtration apparatus of a type used in industrial operations to remove contaminants from a liquid used during manufacturing. After machining such parts as engine blocks, manifolds, it is usual to wash the parts to remove chips, grinding swarf, cutting fluid residue, etc. The parts are conveyed through an enclosed washer chamber where spray jets wash off these contaminants, with the spray liquid and washed off material collected in a tank beneath the washer chamber.

It is necessary to remove the chips and other debris from the liquid to allow continued reuse of the liquid in the washing sprays, and in the past, an inclined filter media belt filter was mounted within the tank, periodically indexed to remove accumulated filtrate, the liquid drawn through the filter media belt to be filtered. A drag conveyor is also periodically indexed to convey accumulated solids out of the tank for disposal. See U.S. Pat. No. 6,042,726 for an example of such a filter.

In this arrangement, the filter apparatus is difficult to service, as the belts and conveyor are enclosed within the washer collector tank.

In some versions, the feeding of disposable media over the belt to remove fine particles would require access to the rear of the tank, which is often difficult in many installations.

To pump the contaminated liquid to an external filter would require a separate tank to receive the liquid in order to allow belt indexing, increasing the floor space and cost of the equipment required.

This situation is also presented with other stand alone equipment such as individual grinders and other machine tools having a dedicated chip cutting fluid collection tanks below the machining zone.

It is the object of the present invention to provide a filter apparatus for removing contaminants received in a tank such as a washer collection tank or other equipment, which apparatus is not necessary to be disposed within the tank and does not itself require a separate collection tank and which can quickly carry out the periodic indexing of a filter media belt to clean solids therefrom.

SUMMARY OF THE INVENTION

The above recited object, and others which will be understood upon a reading of the following specification and claims are achieved by a filter apparatus mounted above a clean tank. A downwardly facing upper pan is movable relative a floor pan to bring a perimeter flange into engagement with a hose seal disposed on the lower pan to create a sealed filter chamber. A vacuum box is mounted below the lower floor pan and connected to the clean tank by a piping connection to transfer fluid to a clean tank, the piping extending out from one side of the vacuum box, down to the level of the clean tank and back into one side of the clean tank. The piping connection has a main control valve located along the length of the fluid connection.

A pump is connected to the clean tank for pumping filtered liquid back to the utilizing equipment, which pumping generates a negative pressure in the clean tank (and also the vacuum box).

A filter belt loop has an upper segment extending into the filter chamber over one segment of the hose seal which extends entirely around the filter chamber and onto a perforated plate supported on a set of elongated bars fixed on the lower pan, and out of the filter chamber over another segment of the hose seal.

A vacuum pump is provided to evacuate air from the tank to prime liquid flow drawn into an inlet pipe connected to the upper pan and extending into the collecting tank containing the liquid to be filtered. Upon opening of the control valve, liquid is drawn into the vacuum chamber, passing through the filter belt and into the vacuum box and thence into the clean tank.

To index the belt to clean accumulated solids, a vacuum breaker valve is opened to allow air into the filter chamber to relieve the vacuum, and drain the dirty liquid from the filter chamber. The main control valve is thereafter closed. A power cylinder lifts the upper pan from the hose seal to allow the filter media belt to be advanced to carry the belt segment on which the solids have accumulated out of the chamber to be discharged.

The recirculation pump continues to be operated during indexing to insure an uninterrupted supply of clean liquid and to maintain a vacuum in the clean tank. The vacuum level increases during pumping to a predetermined maximum level, with an air bleed vacuum control device introducing air into the clean tank when the maximum vacuum is reached to prevent an excessive vacuum level from developing which could interfere with the pumping of clean liquid out of the tank.

Upon reopening the main control valve, liquid to be filtered is again quickly drawn into the vacuum chamber, through the filter belt and into the clean tank via the vacuum box.

The vacuum pump is operated as necessary to eliminate excess air until a predetermined liquid level is restored in the tank sensed by a liquid level switch.

The hose seal may be mounted to filter belt sewn into pockets formed by a fabric cover piece to be carried out and washed when the filter belt is indexed out to clear accumulated solids and to be washed.

In this case, the hose seal may be comprised of two concentric hose loops spaced apart. The space between the hose seals is flooded with low pressure clean liquid which acts to prevent air leaks.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
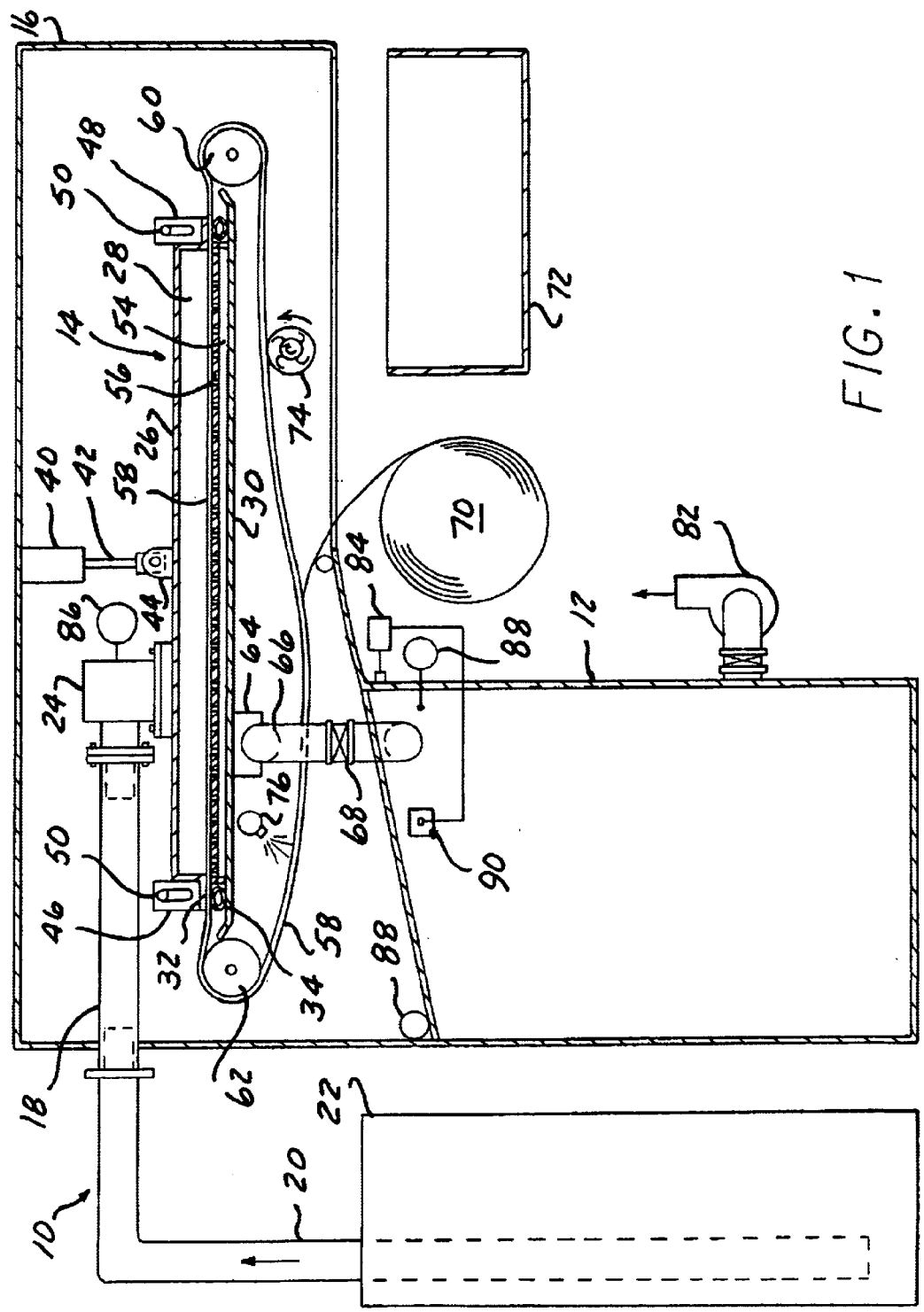
FIG. 1 is a diagrammatic representation of the filter apparatus according to the present invention.

Referring to the drawings, FIG. 1 shows the filter apparatus according to the present invention, which includes a clean liquid tank 12, and a recirculating filter media belt 14 disposed within an enclosure 16 affixed atop the clean tank liquid tank 12.

An inlet hose 18 is connected to an inlet pipe 20 extending down into a collection tank 22 for receiving liquid to be filtered, as from a parts washer.

The clean tank 12 could itself also be received inside the collection tank 22 which would typically be of much larger volume.

The inlet hose 18 is connected to a rotatable inlet fitting 24 affixed to the top of a cover pan 26 so as to be in communication with a vacuum filter chamber 28 defined between the inside the cover pan 26 and a floor pan 30.

The rectangular cover pan 26 has an outwardly projecting perimeter flange 32 which overlies a hose seal 34 resting on the upper surface of the floor pan 30 and coextensive with the flange 30.

Figure 2:
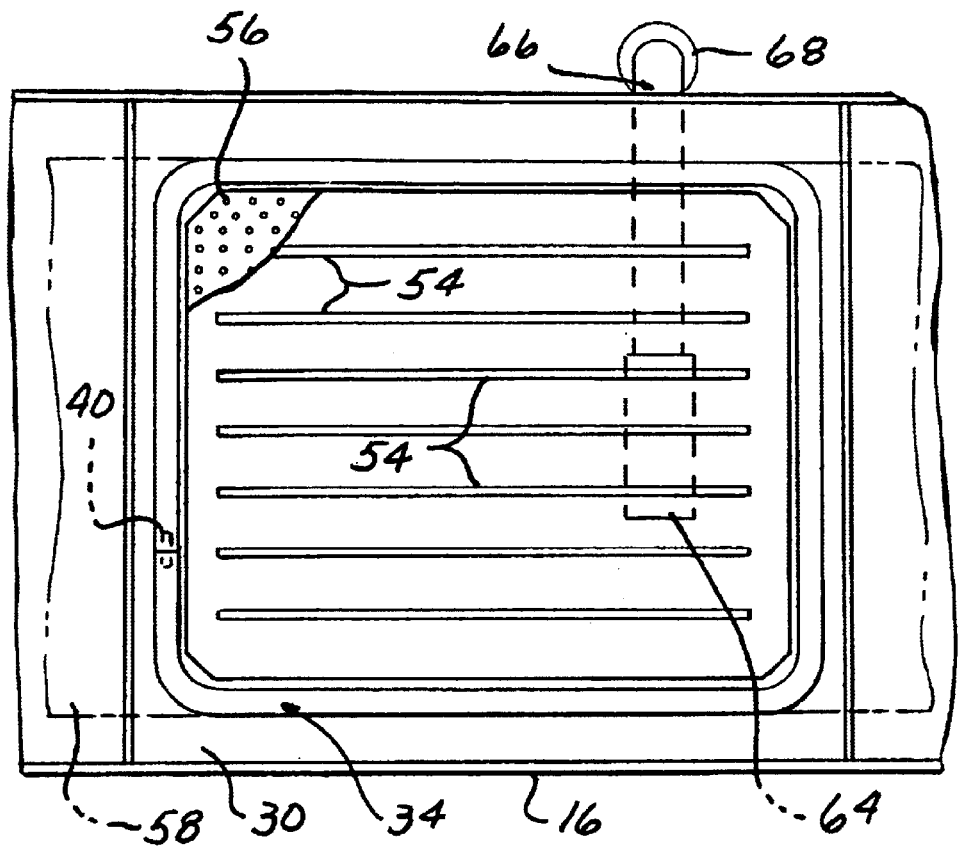
FIG. 2 is a plan view of the lower pan and related components.
Figure 2B:
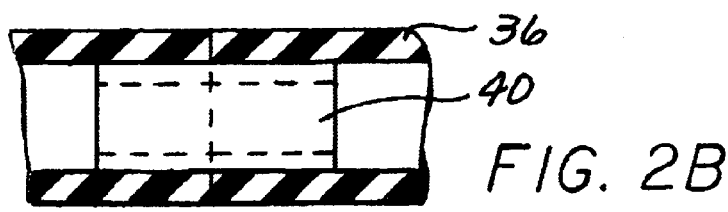
FIG. 2B is a fragmentary enlarged view of a portion of the hose seal showing the end connection.
Figure 2A:
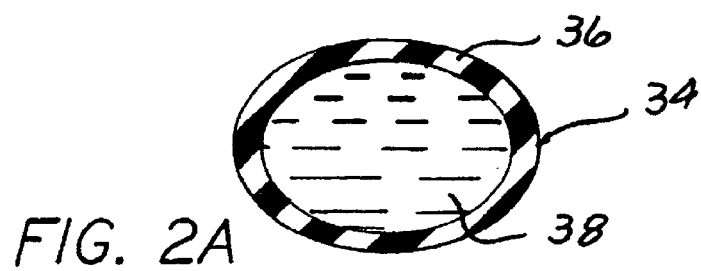
FIG. 2A is an enlarged sectional view of the hose seal.

The hose seal 34 comprises a length of distensible elastomeric sealed tube 36 filled with a liquid 38 (FIG. 2B) and having its ends connected with a coupling 40 (FIG. 2B) so as to define a sealed closed vessel. The hose seal 34 can accommodate misalignments of the flange 32 such as caused by tilting of the cover pan 26 since pressure on one portion will force liquid to another portion to expand the tube 36 to fill any gaps.

The cover pan 26 is mounted for guided up and down movement by actuation of a power cylinder 40 having a rod 42 pinned to a clevis 44 affixed to the top of the cover pan 26. Two slotted front tabs 46 and rear tabs 48 having shorter slots are welded to the front and rear corners respectively of the cover pan 26.

Figure 1A:
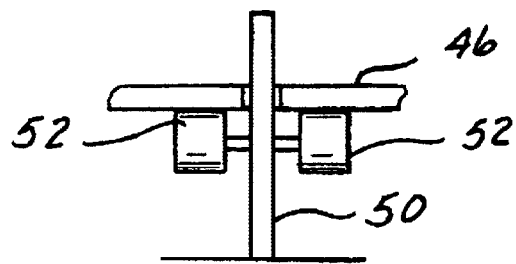
FIG. 1A is an enlarged view of a portion of the filter apparatus shown in FIG. 1 taken in the direction of the arrows A—A in FIG. 1.
Figure 3:
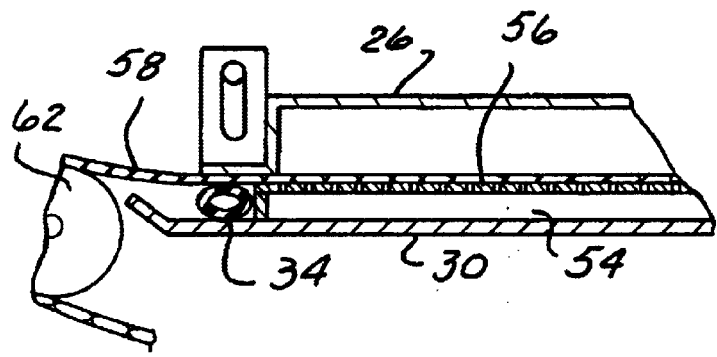
FIG. 3 is a fragmentary enlarged longitudinal sectional view of portions of the filter apparatus shown in FIG. 1.
Figure 4:
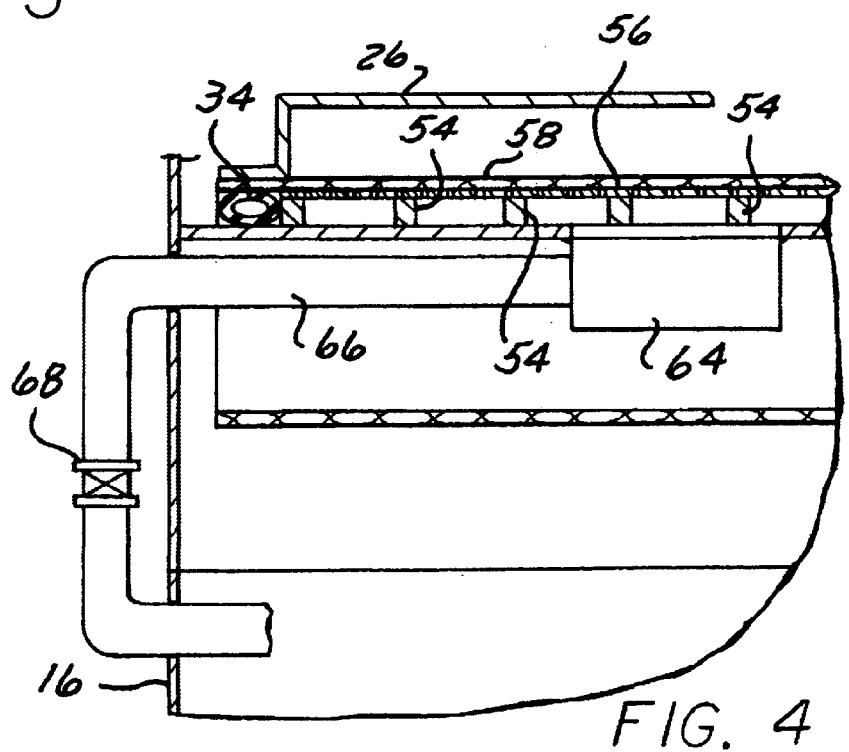
FIG. 4 is an enlarged fragmentary view of a transverse section taken across the cover pan and lower pan components shown in FIG. 1.

Guide pins 50 are fixed to extend into the slotted tabs 46, 48 to limit upward travel and to guide movement of the cover pan 26, with side rollers 52. Rollers 52 on the tab sides locate the cover pan 26 side to side (FIG. 1A).

The cover pan 26 is tilted by the affect of the unequal slots when the cover pan 26 is raised, causing it to be higher at the discharge end to allow the filter cake to pass out when the filter media belt 58 is indexed.

The floor pan 30 has a series of spaced apart parallel bars 54 overlain with a perforated plate 56 to define a support for a permanent media belt 58 extending through the vacuum chamber 28 atop the perforated plate 56. The bars 54 and the perforations in the plates provide openings allowing flow through the filter belt 58 and through the perforated plate 56. The permanent media belt 58 has ends connected to form a loop driven by a shaft mounted reducer 60 around an idler roller 62 when an index cycle is initiated, the return segment thereof passing beneath the floor pan 30.

A vacuum box 64 is mounted below an opening in the floor pan 30, connected to a pipe connection 66 extending to one side of the enclosure 16 and into the upper end of the clean tank 12, a main control valve 68 installed therein to open or close fluid communication between the vacuum box 64 and the clean tank 12.

A disposable media roll 70 may be mounted below the enclosure 16 and fed onto the permanent media belt 58 (started by use of pull bars in the well known manner). Such disposable media can be used depending on the nature of the solids to be filtered out to prevent rapid clogging of the permanent media belt 58 by very fine particles.

When indexed, the permanent media belt 58 is advanced to dump accumulated filter cake out to a receptacle 72.

A rotary beater brush 74 may also be provided to aid in dislodging the solids, and an array of spray nozzles 76 receiving clean liquid under pressure forms jets directed at the inside of the belt 58 at the other end cleans the entrapped particles. A sloping floor 78 of the enclosure 16 collects the spray liquid and dislodged solids directs the same to a drain 80.

A main pump 82 is connected to the lower level of the clean tank 12 to return clean liquid to the washer or other utilizing equipment (not shown).

A vacuum is developed in the clean tank 12 as the liquid is pumped out to cause liquid to be filtered to be drawn up the draw pipe 20 into chamber 28, through the belt 58 (and disposable media if used), into the vacuum box 64 and connection 66, and into the clean liquid tank 12. The pump 82 is continuously operated to supply clean liquid to the utilizing equipment.

Due to the vacuum condition in the chamber 28, a large downward pressure force is exerted on the cover pan 26, compressing the hose seal 34 beneath the flange 32 to insure a complete seal.

A vacuum pump 84 is also connected to the upper region of the clean tank 12 to be able to evacuate air until a predetermined liquid level is reached sensed by a liquid level switch 90. This is done to prime the system at start up to speed filling of the tank 12 with liquid at that time.

The vacuum pump 84 also can eliminate entrained air in the liquid accumulating in the upper region of the tank 12.

In order to carry out an indexing of the media belt 58, a vacuum breaker valve 86 is connected to the fitting 24 to allow air to enter the system and eliminate the vacuum condition.

The liquid in the inlet hose 18 will then flow back down into the tank 22.

When the vacuum is relieved as sensed by a vacuum switch 88, the control valve 68 is immediately operated by the apparatus controls (not shown) to be closed.

The cover pan 26 can then be raised and the belt 58 advanced to carry the segment thereof which was in the chamber 28 out of the chamber to position a fresh segment atop the perforated plate 56.

In the meantime, the pump 82 has continued to draw clean liquid from the tank 12, increasing the vacuum level therein.

A vacuum control device 88 limits the vacuum level to a predetermined maximum (12" hg) which allows the pump 82 to continue pumping smoothly.

The indexing cycle can be completed in a short time, i.e., 30 seconds at a belt speed of 40 ft/minute, and the tank 12 should be sized to allow clean liquid to be continuously pumped during that interval.

After the cover pan 26 is again lowered, vacuum breaker valve 86 closed and control valve 68 reopened, liquid is again drawn into inlet hose 18 and is collected in the clean tank 12 after passing through the filter chamber 28.

The vacuum pump 84 is operated to eliminate excess air until liquid rises to a maximum level, sensed by a liquid level switch 90.

Thus, a filter apparatus has been provided which is located above the tanks and is thus readily accessible for service.

A rapid priming and indexing is enabled to minimize the filter downtime to reduce the capacity required for a given installation.

FIGS. 5–10 show another embodiment of the invention incorporating certain variations over the apparatus described above. All of the details mentioned above are not shown in these drawings.

Figure 5:
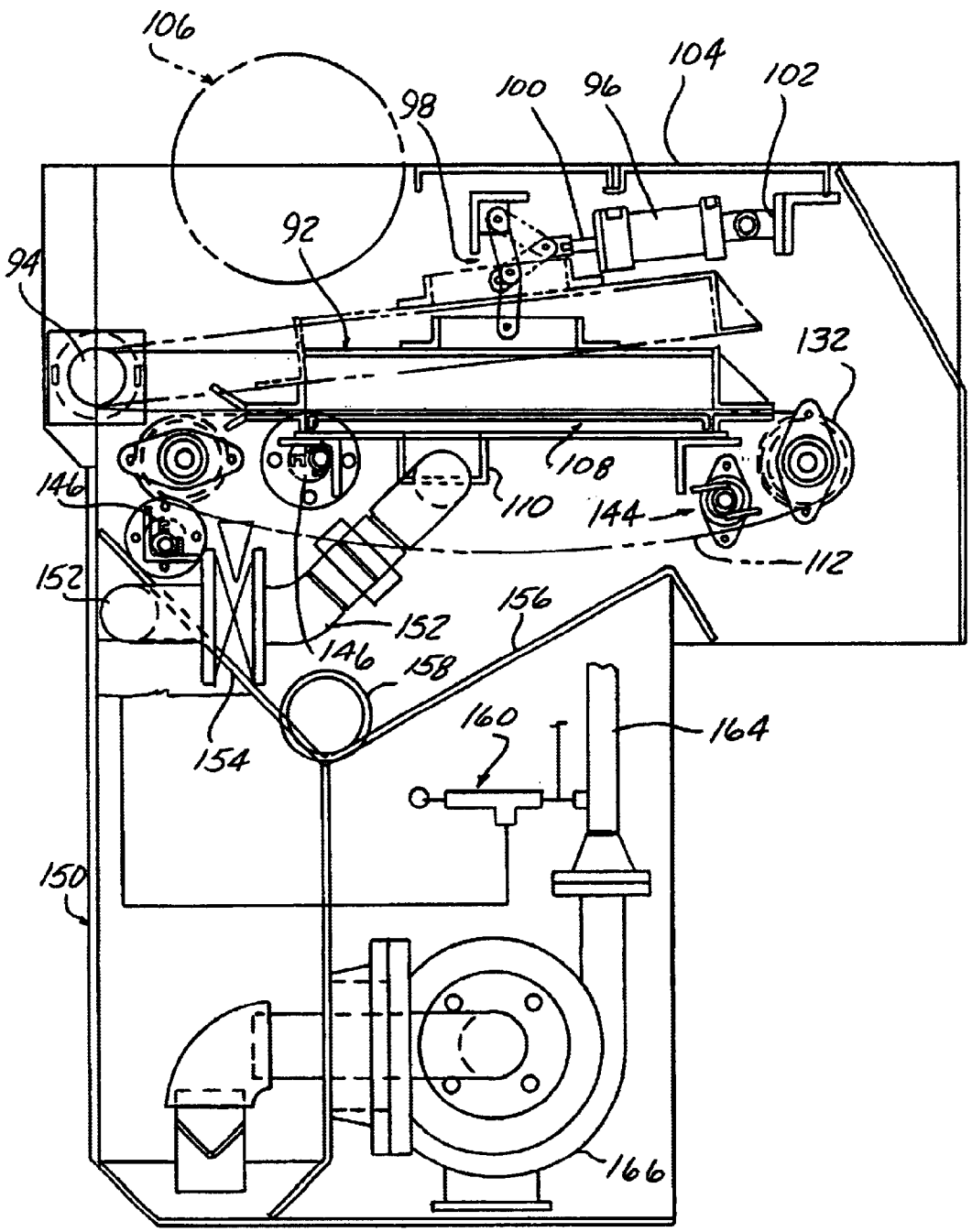
FIG. 5 is front elevational view of a second embodiment of the filter apparatus according to the invention.

As seen in FIG. 5, the cover paw 92 is hinged on the left side at 94 to be swung up to open when a cylinder 96 is operated, a toggle linkage 98 connecting the cylinder rod 100 to the cover pan 92. The cylinder is mounted on a trunnion 102 mounted to a fixed tank cover 104.

An optional disposable media roll 106 is mounted above the cover pan 92 in order to not be wet by seepage from the chamber defined within the upper cover pan 92 and lower pan 108 having the vacuum box 110.

The woven filter belt 112 is driven by a pair of chain loops 114, each secured to a respective side edge by a series of plastic clips 116 (FIG. 10) secured to each side edge of the belt 112 with rivets 118. Polypropylene tape strips 120 are bonded to each side edge for reinforcement.

Each chain loop 114 has a series of connection pins 122 fit into a respective clip 116 to connect each chain loop 114 to a respective side edge. This connection and drive of a filter belt is well known in the art and is described in U.S. Pat. No. 3,807,559.

Figure 8:
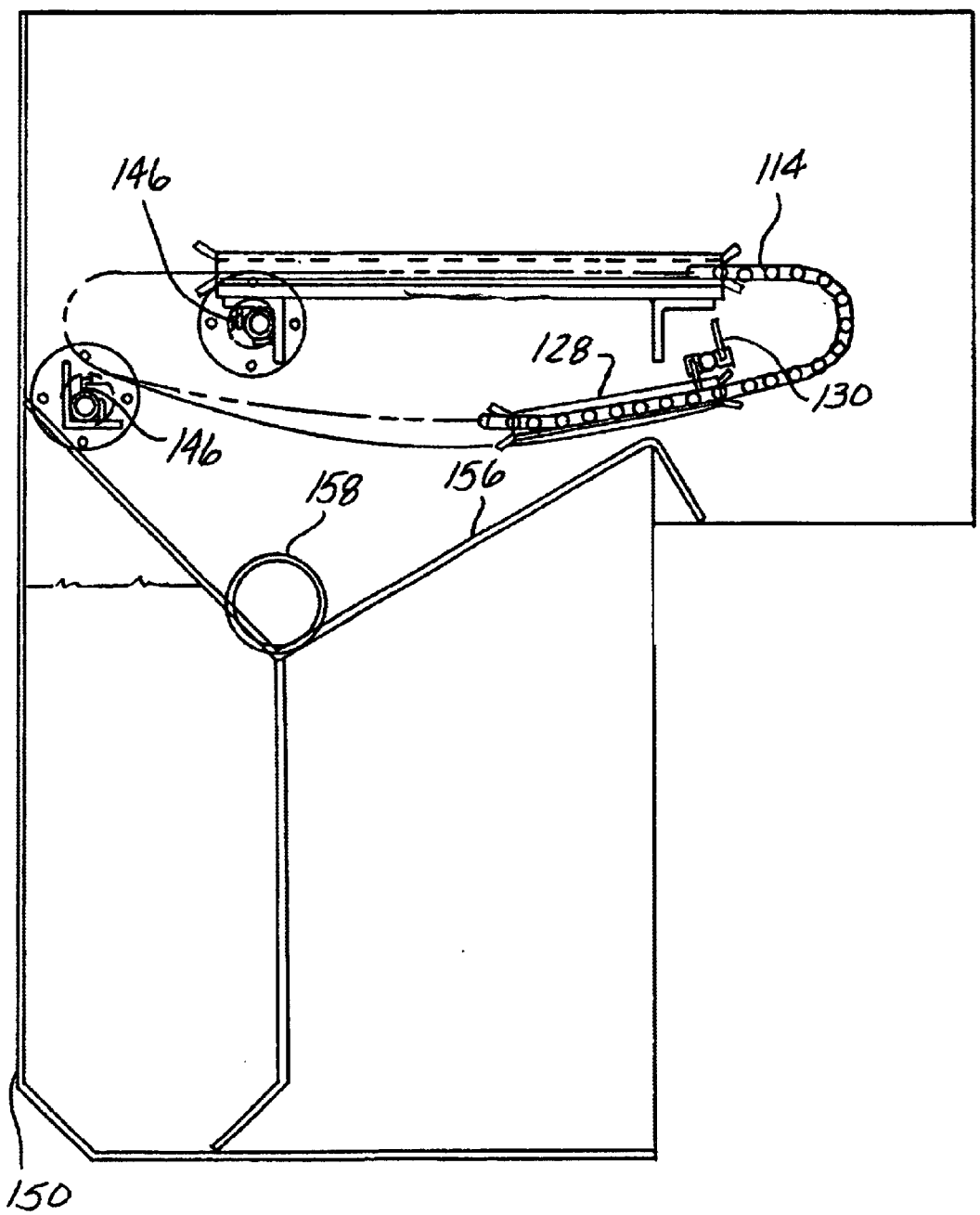
FIG. 8 is a front elevational view showing the filter belt drive chains.
Figure 10:
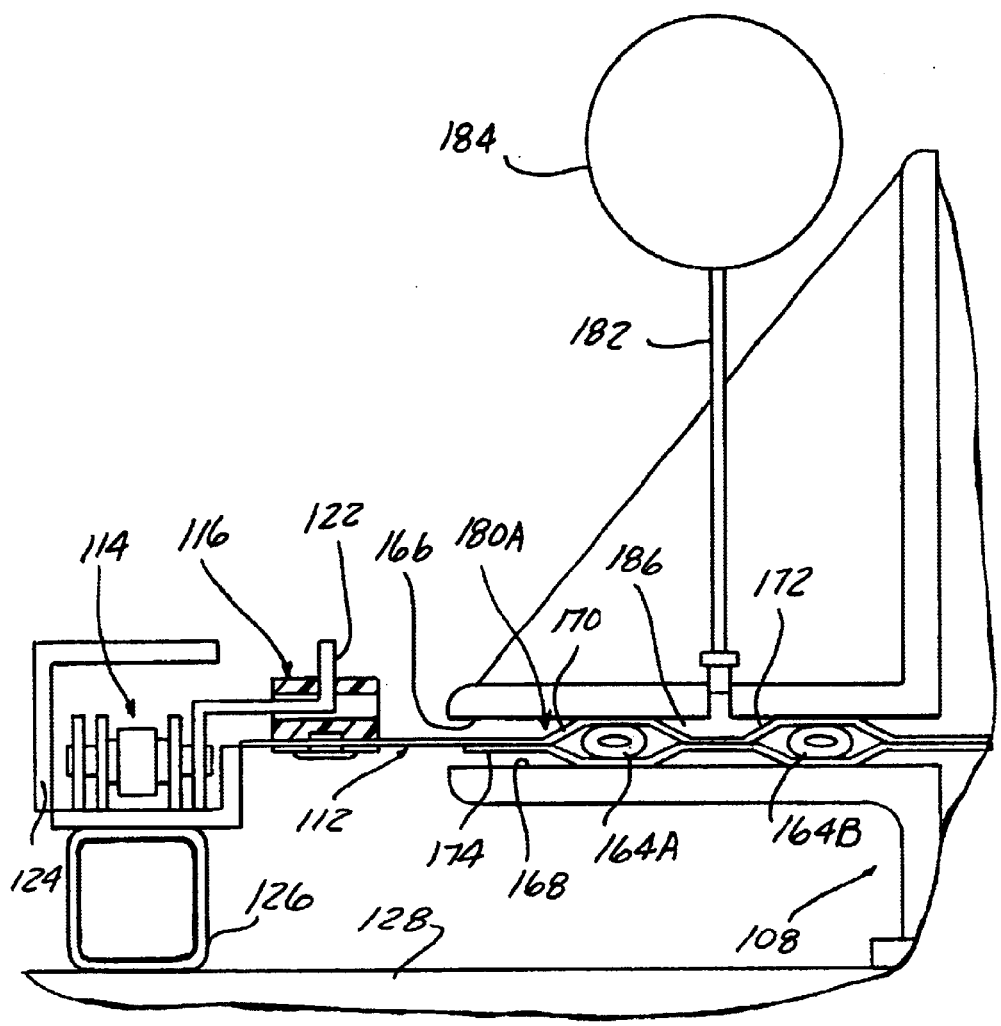
FIG. 10 is an enlarged fragmentary view of one side of the filter belt and adjacent components including the hose seal arrangement.
Figure 9:
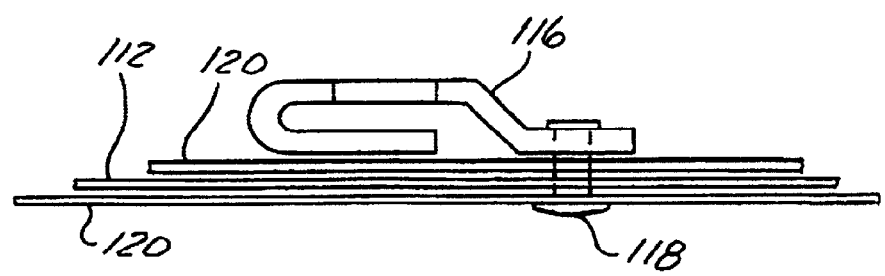
FIG. 9 is an enlarged slightly exploded view of a belt clip installation.

Each chain loop passes through upper chain guides 124 secured to a box tube frame member 126 welded to a tank bottom pan 108. Lower chain guides 128 are also included with a chain take up mechanism 130 (FIG. 8).

A chain drive is more positive and simpler and can be used here since a complete four sided seal may be used to seal the side edges since the belt side edges project out of the housing filter chamber.

Each chain loop 114 is driven by a drive sprocket 132 on each end of a rotatably mounted drive shaft 134 around which the belt passes powered by a right angle drive unit 136.

Figure 6:
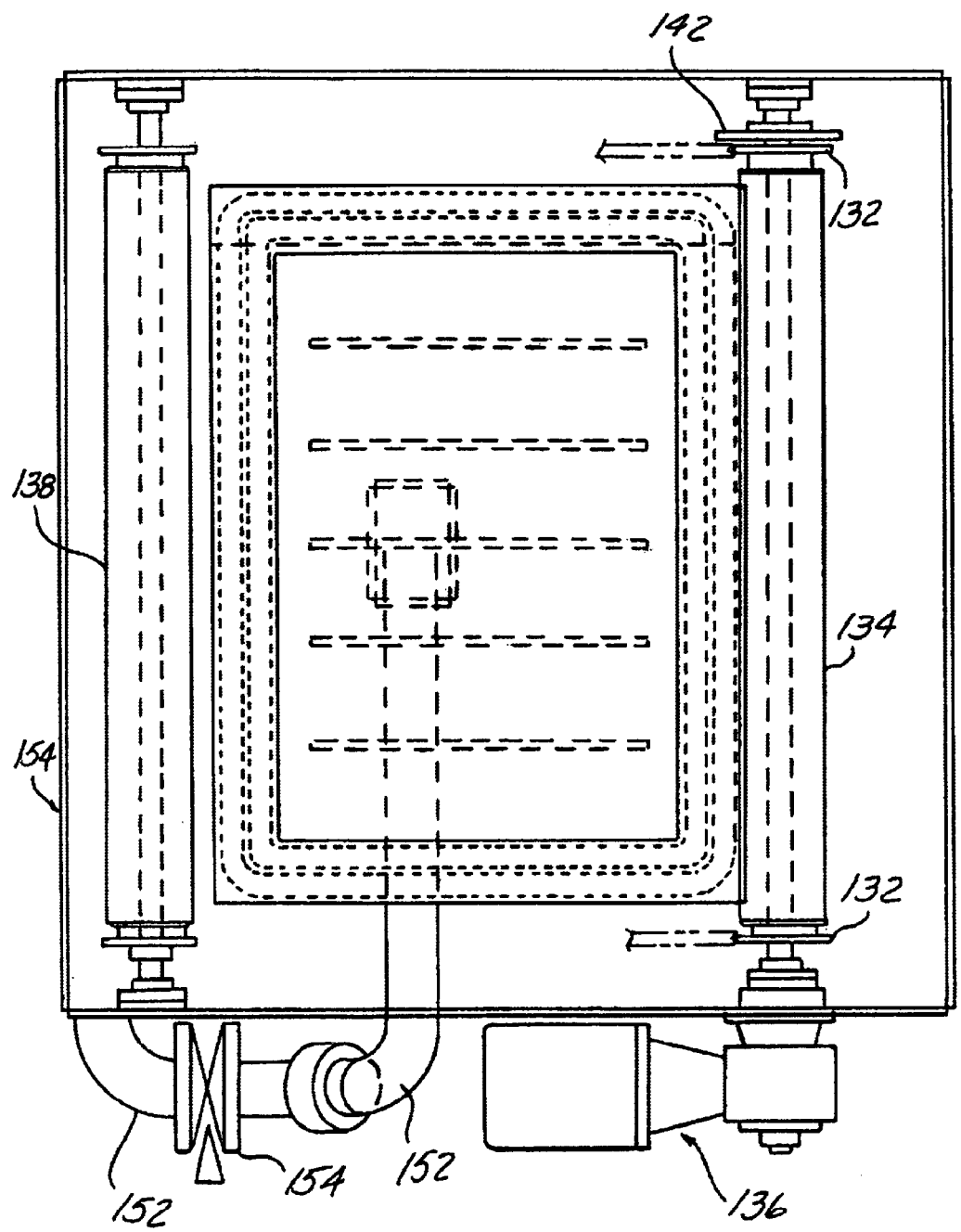
FIG. 6 is a plan view of the embodiment shown in FIG. 5, with the cover pan removed.
Figure 7:
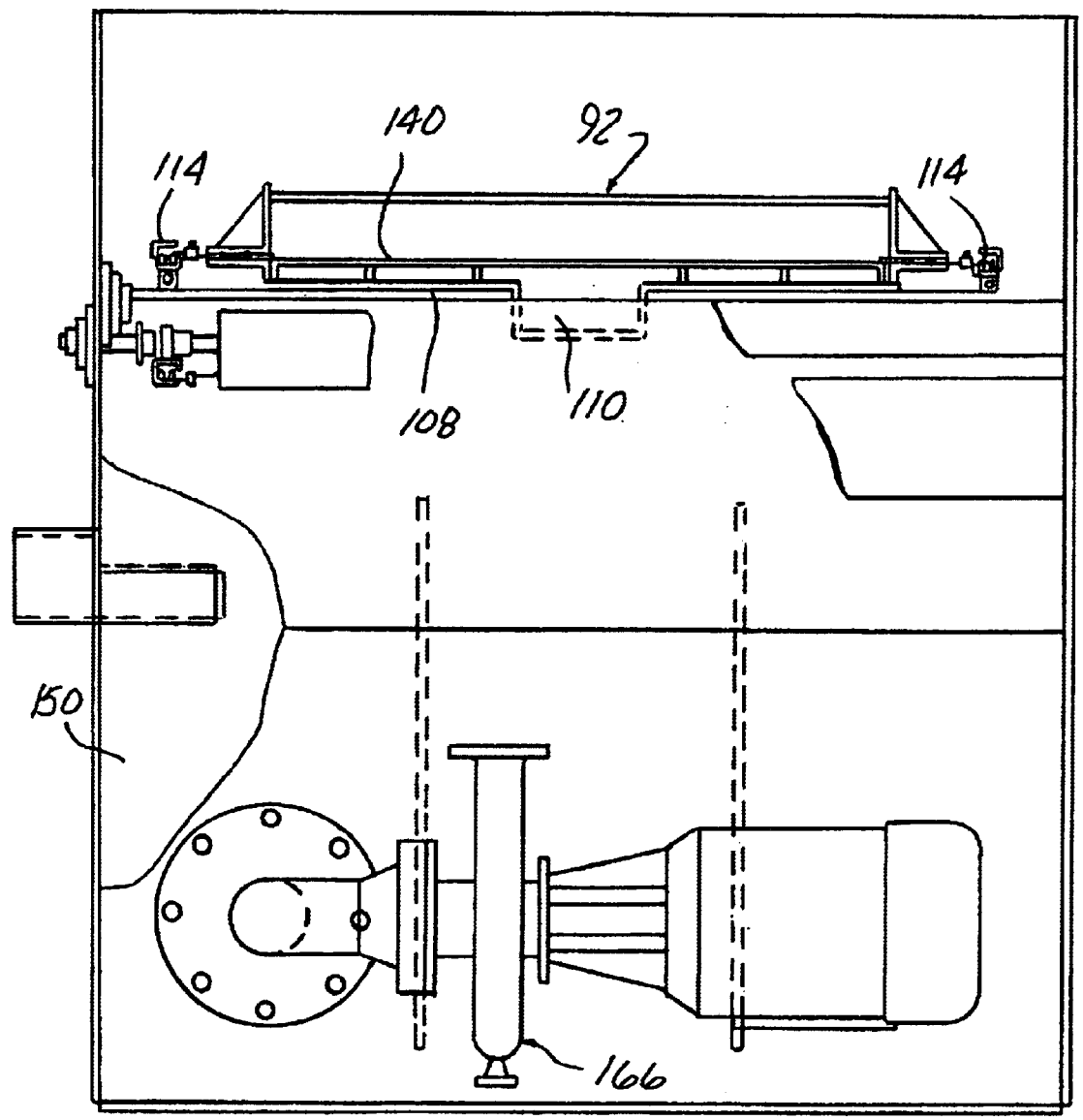
FIG. 7 is a side elevational view of the apparatus shown in FIGS. 5 and 6.

A rotatably mounted tool shaft 138 has idler sprockets 140 on each end to recirculate the chain loops 114 (FIG. 6). The filter belt 112 passes around the shafts 134 and 138.

The drive shaft 134 also drives a sprocket 142 powering a beater shaft 144 which has arms which engage the belt 112 after being indexed out of the filter chamber to remove the filtered out debris accumulated during cleaning. Spray headers 146 are also provided to clean the filter belt 112.

A perforated plate 148 supports the filter belt 112 allowing filtered liquid to be collected in vacuum box 110 after passing through the belt 112.

The vacuum box 110 is normally placed in fluid communication with the interior of the clean tank 150 via fluid conduits 152 and main control valve 152.

A Vee shaped collection trough 156 is formed on the top of the clean tank 150, with an outlet 158 provided for recirculating drained liquid wash to the dirty liquid tank (not shown).

An ejector 162 is utilized as the vacuum pump to remove air from the clean liquid tank 150 as described above, connected to the outlet from main pump 166. The clean liquid flowing from the ejector 162 may be used to flush the trough 156 as indicated in FIG. 5. Suitable sensors as described above in connection with a vacuum pump would be used to control the ejector 162.

A special sealing arrangement 180A is incorporated in this embodiment. The fixed seal described above can sometimes lead to accumulation of solids in the spaces around the hose seal over extended periods. Also, chips sometime lodge against the seal and create an air leak into the vacuum chamber lowering the vacuum and reducing the efficiency of the filter. This necessitates manual removal and cleaning of the seal.

In this embodiment, a hose seal arrangement 180A is incorporated into the belt 112 so that the seal is moved out with the segment of the filter belt 112 receiving liquid flow during a cleaning cycle to remove accumulated solids.

The hose seal arrangement 180A includes two looped hose seals 164A, 164B which are nested one within the other with an intervening space therebetween. The hose seals 164A, 164B are each filled with a liquid as in the seal described above. The hose seals 164A, B are held in a generally rectangular pattern by respective stitched pockets 170, 172 matched to the perimeter of the flanges 166 of the cover pan 92 and facing flange 168 of the bottom pan 108 when the filter belt 112 is indexed in its operation position. The stitched pockets are formed by a fabric border layer 174 sewn to the underside of the belt 112, with stitching rows 176 forming the pockets 170, 172.

Figure 11:
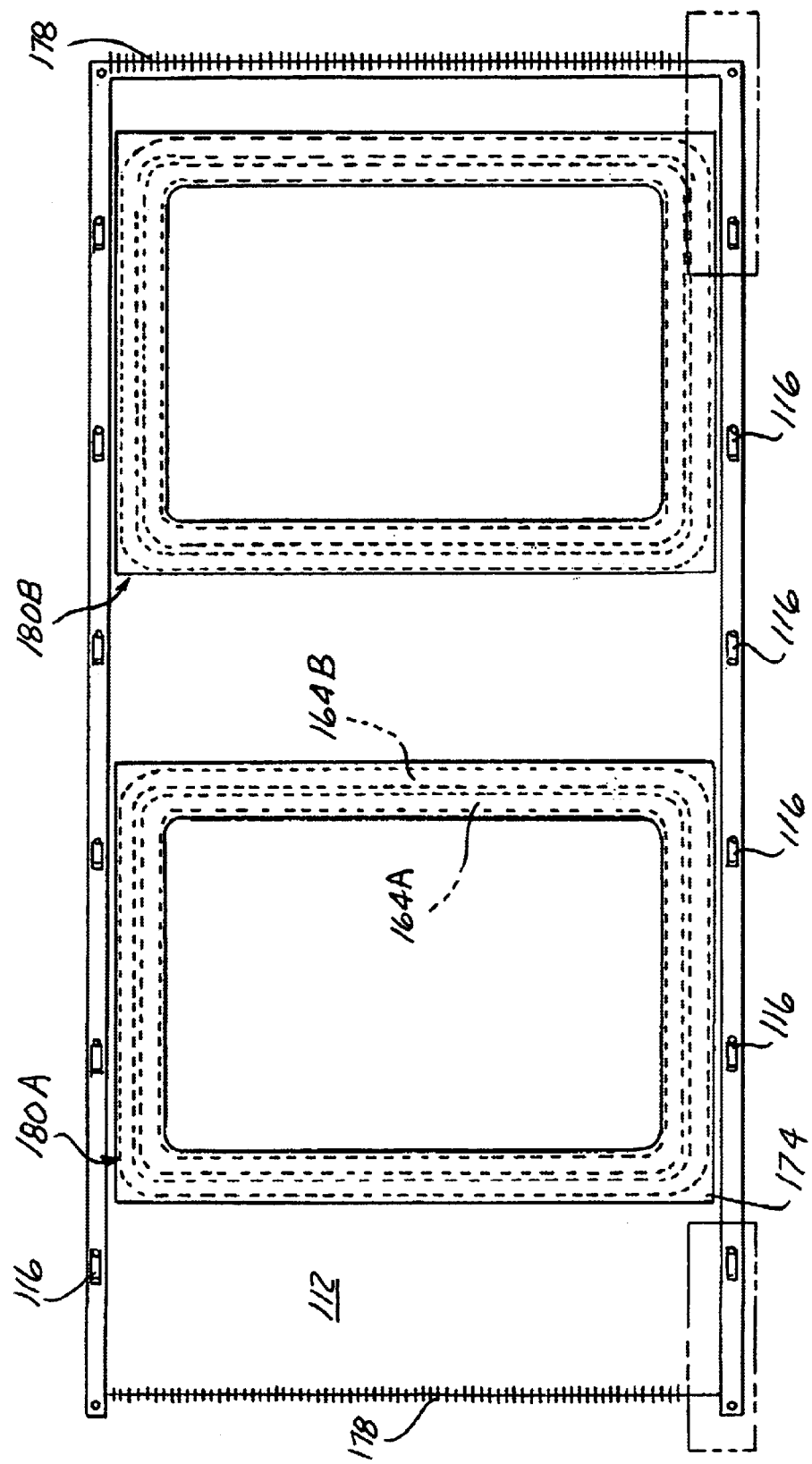
FIG. 11 is a developed view of the filter belt incorporated in the filter apparatus shown in FIGS. 5–7.

The ends of the belt 112 are connected by conventional clipper lacing 178 (FIG. 11) and snaps (not shown) to form an endless loop passing around the shafts 138, 134 (FIG. 6).

A tube 182 is connected to tap a source 184 of low pressure clean filtered liquid to direct the same into an intervening space 186 between the hose seals 164A, 164B to fill the same with liquid under low pressure.

The filter belt 112 and border piece 174 are porous to allow the liquid to fill the intervening space both above and below the belt 112. The belt 112 and border piece 174 can be coated with polyurethane in the areas over and under the pockets 170 to improve wear resistance in the well known manner.

A second identical sealing arrangement 180B can also be provided at a second location on the belt 112 in order to provide a spare in the event the belt 112 or seal arrangement 180A becomes worn out or clogged. Normally, the same belt segment surrounded by the first seal arrangement 180A would be indexed back into service after each cleaning cycle to prevent dry out and shortened belt life, and the second sealing arrangement 180B indexed into position only as a replacement after the first belt segment is no longer functional.

The presence of the liquid in space 186 tends to prevent leakage of air in the event a chip gets caught beneath the belt 112 in the region of the hose seals 164A, B. In that event, only a minor seepage would result, and plugging the liquid leak normally occurs by itself as solid particles flow to the leak and tend to clog the leak point. Air leaks can interfere with efficient operation of the filter a result of the consequence loss of vacuum while a minor liquid leak is normally significant of no consequence. Thus, this seal arrangement provides the reliability of the filter and reduces maintenance requirements.

What is claimed is:

1. A method of filtering liquids comprising the steps of:
   arranging a segment of a filter media belt loop to overlie a support having openings allowing liquid flow through said filter media belt;
   enclosing said filter media belt and support to define a sealed filtering chamber;
   establishing fluid communication with an enclosed region on one side of said support to a sealed clean liquid tank;
   establishing fluid communication of an enclosed region of said filter chamber on the other side of said filter media belt to a source of a liquid to be filtered; and
   pumping liquid out of said sealed clean liquid tank to create a vacuum drawing liquid to be filtered into said region on said other side said filter media belt, through said filter media belt and into said sealed clean liquid tank.

2. The method according to claim 1 wherein said step of enclosing said filter media belt and support includes the step of moving a cover onto said filter media belt and support to sealingly engage the same and define said region on the other side of said filter media belt.

3. The method according to claim 2 wherein said enclosing step includes the step of engaging a perimeter seal with a perimeter of said cover.

4. The method according to claim 3 further including the step of relieving the vacuum in said enclosed regions and thereafter raising said cover, indexing a segment of said filter media belt off said support to carry accumulated solids out of said enclosed region on one side of said filter media belt, and cleaning said solids from said segment.

5. The method according to claim 4 wherein said step of pumping liquid out of said clean liquid tank continues while said cover is raised and fluid communication to said clean liquid tank is blocked while said cover is raised.

6. The method according to claim 5 wherein said step of relieving said vacuum includes the step of venting said enclosed region and thereafter closing communication between said enclosure and said clean liquid tank after vacuum is relieved thereby.

7. The method according to claim 5 further including the step of controllably venting said clean liquid tank when the vacuum level in said clean liquid tank reaches a predetermined maximum to limit the vacuum level developed therein.

8. The method according to claim 7 further including the step of pumping air out of said clean liquid tank until a predetermined liquid level in said tank is reached.

9. The method according to claim 3 in the step of engaging a perimeter seal includes the step of mounting a hose seal arrangement to said filter media belt and locating said hose seal arrangement beneath said cover by indexing movement of said filter belt.

10. The method according to claim 9 wherein in said mounting step a pair of spaced concentric hose seal loops are mounted to said filter belt, and further including the step of directing a liquid into an intervening space between said hose seal loops when said hose seals are compressed by said cover.

* * * * *